(12) United States Patent
Hirata

(10) Patent No.: US 10,558,745 B2
(45) Date of Patent: Feb. 11, 2020

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventor: Motoharu Hirata, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/223,445

(22) Filed: Jul. 29, 2016

(65) Prior Publication Data

US 2017/0277675 A1 Sep. 28, 2017

(30) Foreign Application Priority Data

Mar. 23, 2016 (JP) ................................ 2016-058585

(51) Int. Cl.
  *G06F 17/24* (2006.01)
  *G06F 17/21* (2006.01)

(52) U.S. Cl.
  CPC .......... *G06F 17/248* (2013.01); *G06F 17/211* (2013.01); *G06F 17/24* (2013.01); *G06F 17/241* (2013.01)

(58) Field of Classification Search
  CPC ...... G06F 17/24; G06F 17/248; G06F 17/241; G06F 17/211
  See application file for complete search history.

(56) References Cited

U.S. PATENT DOCUMENTS

| | | | | |
|---|---|---|---|---|
| 7,900,142 | B2 * | 3/2011 | Baer | ................ G06F 17/24 707/639 |
| 2007/0030286 | A1 * | 2/2007 | Hirasaka | ........... G06T 19/20 345/619 |
| 2008/0109717 | A1 * | 5/2008 | Krauter | ............ G06F 17/24 715/255 |
| 2009/0231352 | A1 * | 9/2009 | Bhatt | ............ G06F 3/04847 345/581 |
| 2010/0086234 | A1 * | 4/2010 | Massena | ............ G06T 11/60 382/311 |
| 2010/0318899 | A1 | 12/2010 | Kitada | |
| 2011/0107246 | A1 * | 5/2011 | Vik | ................ G06F 3/0481 715/771 |

(Continued)

FOREIGN PATENT DOCUMENTS

| | | |
|---|---|---|
| JP | 2004-295651 A | 10/2004 |
| JP | 2005-063130 A | 3/2005 |

(Continued)

OTHER PUBLICATIONS

Sep. 17, 2019 Office Action issued in Japanese Patent Application No. 2016-058585.

*Primary Examiner* — Chau T Nguyen
(74) *Attorney, Agent, or Firm* — Oliff PLC

(57) ABSTRACT

An information processing apparatus includes: a memory that stores a plurality of templates which define different designs from each other with respect to a target object; an acquiring unit that acquires, for individual user, edit information indicating a history of editing performed by the user for the template; and an output unit that outputs information about the template that meets an editing tendency of the user for the template, for the individual user, the editing tendency being acquired from the edit information.

5 Claims, 11 Drawing Sheets

(56) References Cited

U.S. PATENT DOCUMENTS

| | | | |
|---|---|---|---|
| 2014/0068423 A1* | 3/2014 | Nakashima | G06F 17/241 715/243 |
| 2014/0250411 A1* | 9/2014 | Gilra | G06F 3/04842 715/811 |
| 2014/0331126 A1* | 11/2014 | Hunter | G06F 17/2288 715/256 |
| 2016/0042302 A1* | 2/2016 | Watanabe | G06F 16/2455 705/5 |
| 2016/0378734 A1* | 12/2016 | Mullins | G06F 3/04845 715/229 |

FOREIGN PATENT DOCUMENTS

| | | |
|---|---|---|
| JP | 2008-146226 A | 6/2008 |
| JP | 2011-238047 A | 11/2011 |
| JP | 2013-101518 A | 5/2013 |
| JP | 2014-085814 A | 5/2014 |

\* cited by examiner

FIG.6

| EDIT INFORMATION ID | USER ID | OBJECT ATTRIBUTE | EDITING DIFFERENCE |
|---|---|---|---|
| 0001 | User0100 | TITLE | • FONT: JUN Pro34 ⇒ SHIN MARU GO EMBOSS<br>• FONT SIZE: 90pt→160pt<br>• OBJECT SIZE: (70%,8%)⇒(92%,15%) |
| 0002 | User0100 | BACKGROUND IMAGE | • SELECTED IMAGE: NO CHANGE<br>• OBJECT POSITION: (0%,0%)⇒(0%,20%)<br>• OBJECT SIZE: (100%,100%)⇒(100%,80%) |
| 0003 | User0099 | BACKGROUND IMAGE | ... |
| ... | ... | ... | ... |

FIG. 7

| EDIT INFORMATION ID | USER ID | OBJECT ATTRIBUTE | EDITING DIFFERENCE |
|---|---|---|---|
| 0001 | User0100 | TITLE | · FONT: JUN Pro34 ⇒ SHIN MARU GO EMBOSS<br>· FONT SIZE: 90pt⇒160pt<br>· OBJECT SIZE: (70%,8%)⇒(92%,15%) |
| 0107 | User0100 | TITLE | · FONT SIZE: 90pt⇒100pt |
| 0543 | User0100 | TITLE | · FONT: JUN Pro34 ⇒ SHIN MARU GO EMBOSS<br>· FONT SIZE: 90pt⇒160pt<br>· OBJECT SIZE: (70%,8%)⇒(92%,15%) |
| ... | ... | ... | ... |

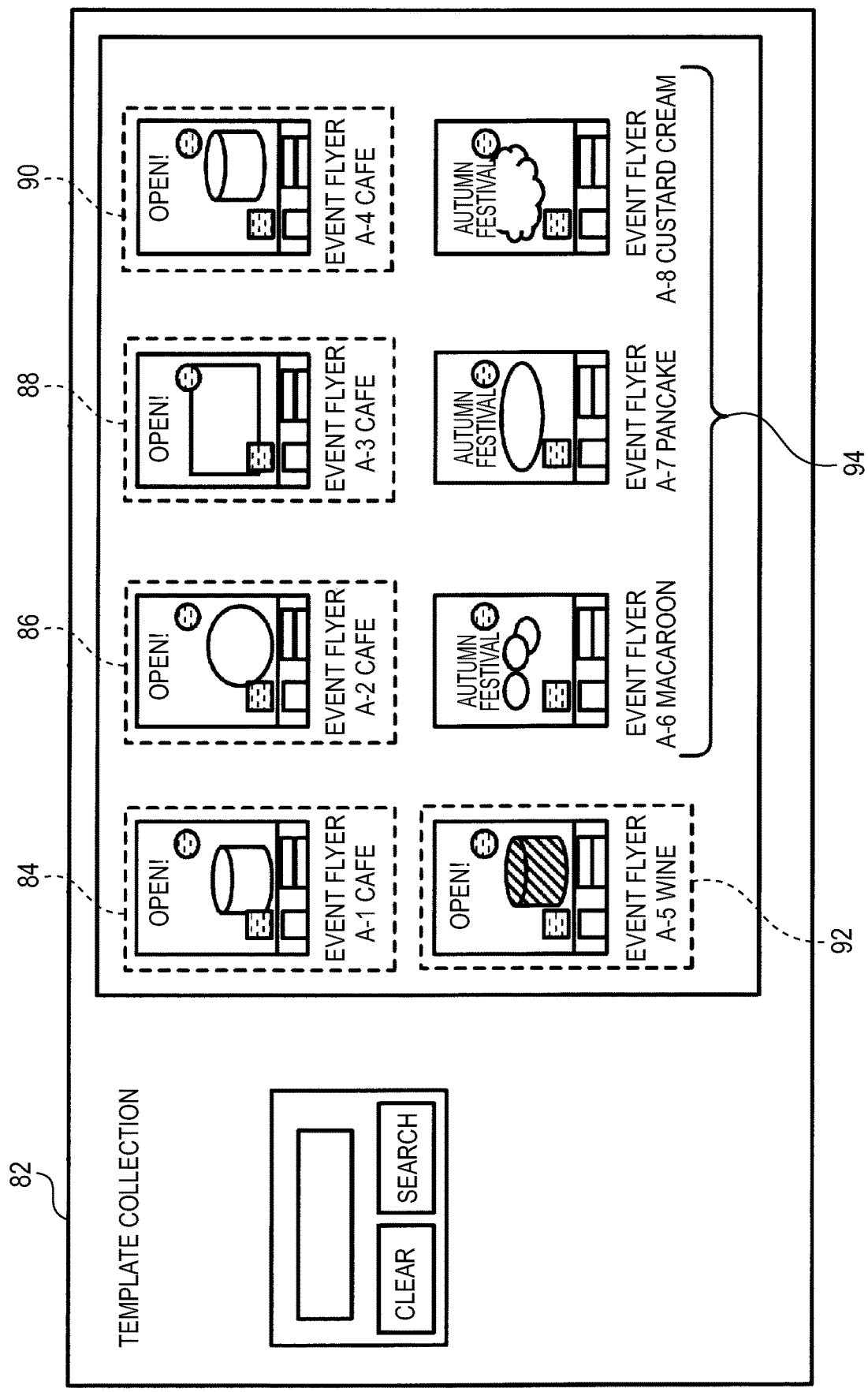

FIG.10

| EDIT INFORMATION ID | USER ID | OBJECT ATTRIBUTE | EDITING DIFFERENCE | OTHER OBJECT INFORMATION |
|---|---|---|---|---|
| 0011 | User0100 | TITLE | • FONT SIZE: 90pt⇒160pt<br>...... | • BACKGROUND IMAGE (OBJECT SIZE:○○, IMGE MOTIF:MEAT, ....)<br>• SUBTITLE (OBJECT SIZE: 45pt, ....) |
| 0107 | User0100 | TITLE | • FONT SIZE: 90pt⇒60pt<br>...... | • BACKGROUND IMAGE (OBJECT SIZE:△△, IMGE MOTIF:FRIED FOOD, ....)<br>• SUBTITLE (OBJECT SIZE: 25pt, ....) |
| 0543 | User0100 | TITLE | • FONT SIZE: 90pt⇒160pt<br>...... | • BACKGROUND IMAGE (OBJECT SIZE:□□, IMGE MOTIF:MEAT, ....)<br>• SUBTITLE (OBJECT SIZE: 10pt,....) |
| ... | ... | ... | ... | ... |

FIG.11
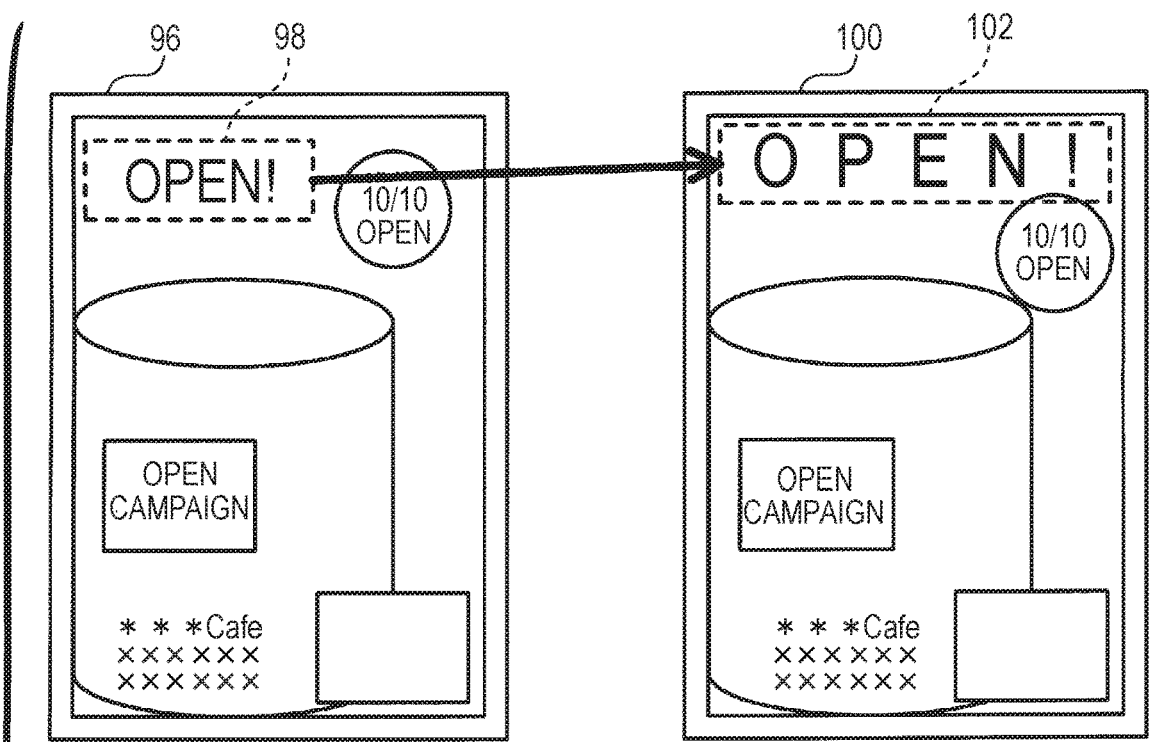
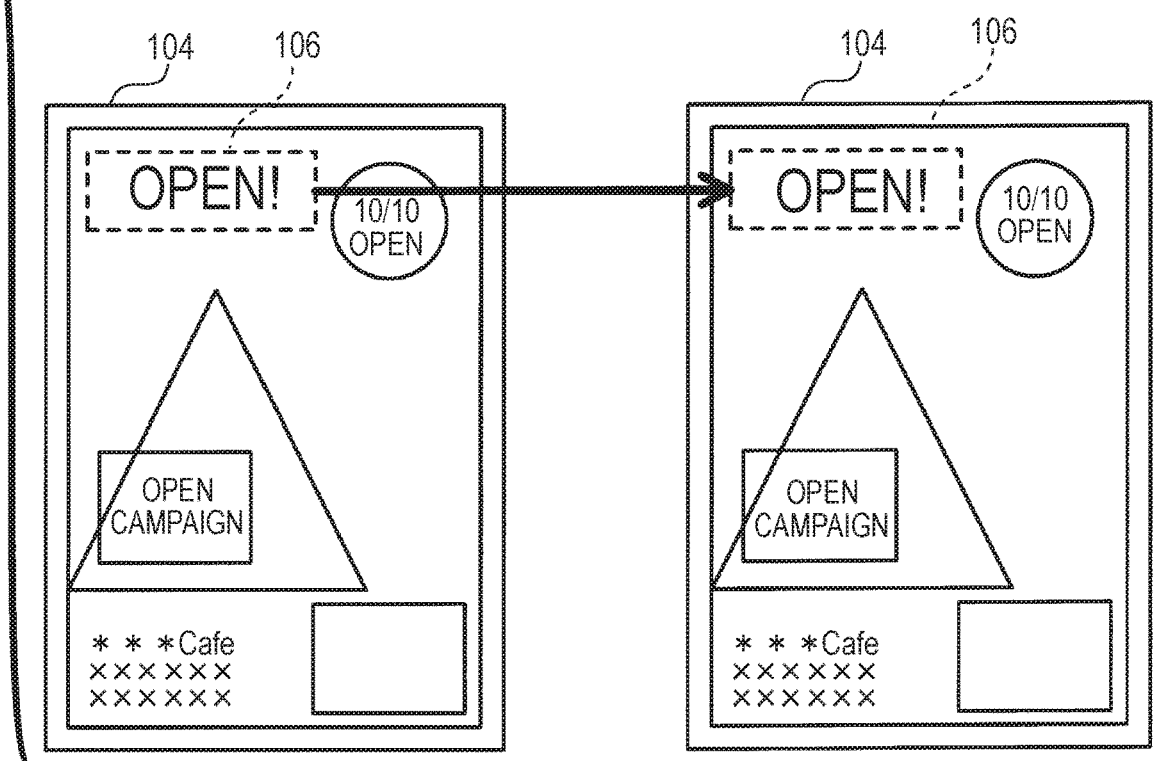

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-058585 filed Mar. 23, 2016.

BACKGROUND (i) Technical Field

The present invention relates to an information processing apparatus and a non-transitory computer readable medium.

(ii) Related Art

A user selects a specific template from among plural different templates (design samples) which define the designs of a target object, and creates the design of a certain target object by using the specific template, in some cases.

SUMMARY

According to an aspect of the invention, an information processing apparatus includes: a memory that stores a plurality of templates which define different designs from each other with respect to a target object; an acquiring unit that acquires, for individual user, edit information indicating a history of editing performed by the user for the template; and an output unit that outputs information about the template that meets an editing tendency of the user for the template, for individual user, the editing tendency being acquired from the edit information.

BRIEF DESCRIPTION OF THE DRAWINGS

Exemplary embodiments of the present invention will be described in detail based on the following figures, wherein:

FIG. 6 is a diagram illustrating an example of an edit information table;

FIG. 7 is a diagram illustrating an example of the edit information table;

FIG. 9 is a schematic diagram illustrating a display example of a thumbnail image of a template;

FIG. 10 is a diagram illustrating an example of an edit information table according to a modification example; and FIG. 11 is a schematic diagram illustrating a basic template and an individual template.

DETAILED DESCRIPTION

Figure 1:
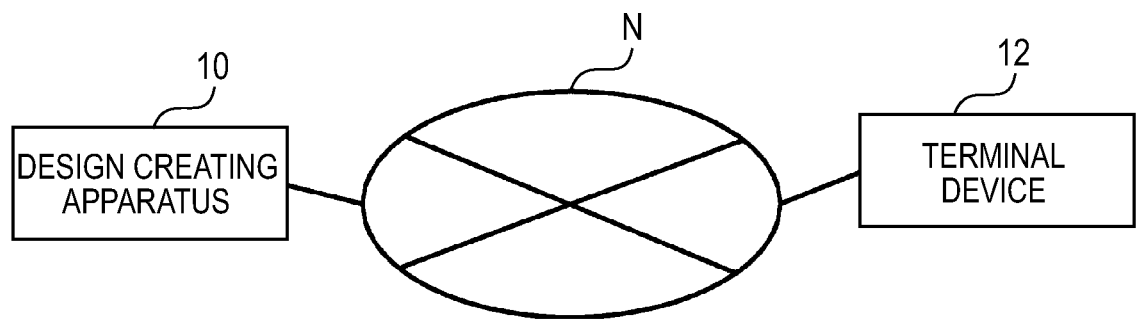
FIG. 1 is a block diagram illustrating a design creating system according to an exemplary embodiment of the present invention.

A design creating system will be described as an information processing system according to an exemplary embodiment of the present invention. FIG. 1 illustrates an example of the design creating system according to the exemplary embodiment. The design creating system includes a design creating apparatus 10 and a terminal device 12, which are the information processing apparatuses. The design creating apparatus 10 and the terminal device 12 are connected to a communication path N such as a network. In the example illustrated in FIG. 1, a single terminal device 12 is connected to the communication path N, but plural terminal devices 12 may be connected to the communication path N.

The design creating apparatus 10 is an apparatus that stores data of a template which defines the design of a target object, and provides the data of the template. The target object is, for example, a business card, a flyer, an advertisement, a direct mail (DM), a poster, a postcard, a catalog, other documents, clothes, a car, a building, a bridge, or the like. Further, the design creating apparatus 10 has a function of transmitting and receiving data to and from other apparatuses.

The terminal device 12 is an apparatus such as a personal computer (PC), a tablet PC, a smart phone, and a mobile phone, and has a function of transmitting and receiving data to and from other apparatuses. The terminal device 12 is used to create, for example, the design of the target object.

In this exemplary embodiment, plural templates that define different designs from each other are provided from the design creating apparatus 10 to the terminal device 12. In the terminal device 12, a specific template is selected from among the plural templates, and the selected template is edited.

Incidentally, the terminal device 12 may be built into the design creating apparatus 10 so as to form an apparatus in which the design creating apparatus 10 and the terminal device 12 are physically integrated.

Figure 2:
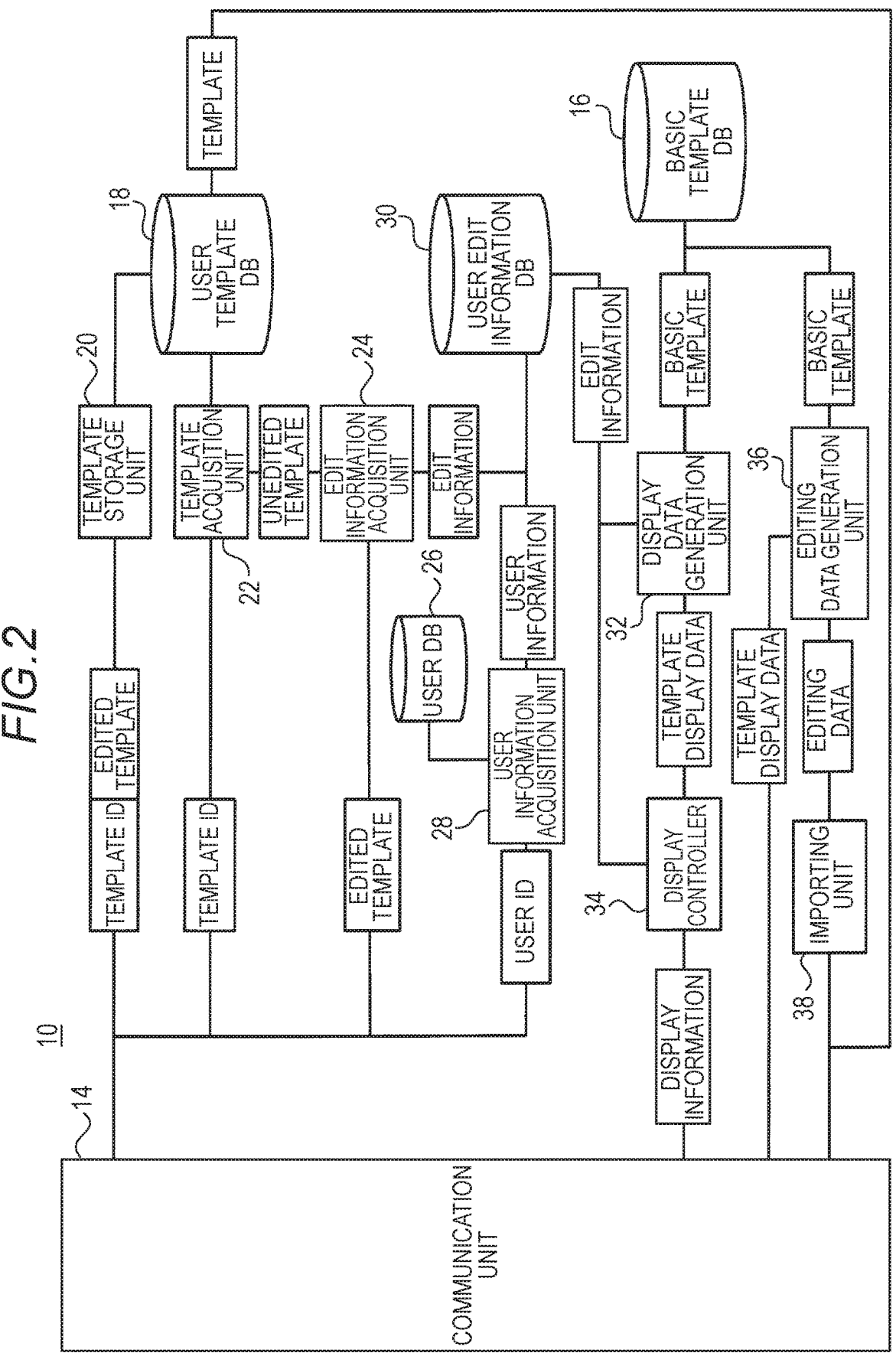
FIG. 2 is a block diagram illustrating a design creating apparatus according to the exemplary embodiment.

Hereinafter, the configuration of the design creating apparatus 10 will be described in detail with reference to FIG. 2. FIG. 2 illustrates the configuration of the design creating apparatus 10.

A communication unit 14 is a communication interface, and has a function of transmitting data to other apparatuses and a function of receiving data from other apparatuses through the communication path N. For example, the data of a template is transmitted to the terminal device 12, and information that is transmitted from the terminal device 12 is received, by the communication unit 14.

The basic template database (DB) 16 is a storage device such as a hard disk, and stores data of plural basic templates that define different designs from each other. The basic template is a model of a design for the target object. The plural basic templates that define different designs from each other are created in advance and stored in advance in the basic template DB 16 for each target object. For example, plural templates that define different designs from each other are created in advance for the business card. The same is applied to other target objects. A template ID, which is template identification information for identifying the basic template, is associated with each basic template. In addition, information indicating the template name, information indicating the use of the basic template (target objects which are suitable for the basic template), information indicating the taste (impression) that the basic template evokes, and the like may be associated with each basic template. The basic template is searched for by using these pieces of information. For example, the taste is determined in advance in accordance with a preference model that is obtained by typifying the impression that a person has for a certain target.

The basic template includes, for example, one or plural types of objects (design items or design parts). In the basic template, one or plural objects are located depending on a preset layout condition. In the basic template of a flyer or an advertisement, the object is, for example, a title (heading) character object, a text character object, an image object, a graphic object, or the like.

The user template database (DB) 18 is a storage device such as a hard disk, and is a device which stores, for example, data of a basic template that is designated by the user, data of an individual template that is generated by customizing (processing) the basic template for individual user, data of an edited template that is generated by editing the basic template or the individual template, or the like, for individual user. A user ID, which is user identification information for identifying the user, is associated with each template. The user is permitted to view and edit the template that is associated with the user himself or herself, and is prohibited from viewing and editing the templates that are associated with other users.

The template storage unit 20 stores the data of the edited template generated by editing the basic template or the individual template in association with the user ID of the user who performs editing in association with each other in the user template DB 18. For example, the user edits the basic template or the individual template by using the terminal device 12 to generate the edited template. In a case where the edited template is generated in terminal device 12, the data of the edited template is transmitted from the terminal device 12 to the design creating apparatus 10 through the communication path N, and is stored in the user template DB 18 by the template storage unit 20. It is of course possible that the design creating apparatus 10 may edit the basic template or the individual template, in response to the instruction from the user using the terminal device 12, and store the edited template which is generated in this way in the user template DB 18.

The template acquisition unit 22 acquires the unedited template associated with the input template ID from the user template DB 18, and outputs the acquired unedited template to the edit information acquisition unit 24. The unedited template is a basic template or an individual template before editing. For example, the template acquisition unit 22 receives the template ID of the editing target template during editing or after editing the template, acquires the unedited template associated with the template ID from the user template DB 18 and outputs the unedited template to the edit information acquisition unit 24.

The edit information acquisition unit 24 receives the data of the edited template (a template that is generated by editing the basic template or the individual template) and data of the unedited template (the basic template before editing or the individual template before editing), and generates edit information indicating a difference between the edited template and the unedited template. The edit information acquisition unit 24 generates, for example, edit information indicating a difference between the edited template and the unedited template, for individual object. The edit information is history information (information indicating the history of editing) indicating which editing is performed on the template by the user, and specifically, information indicating the history of editing for respective objects constituting a template. The edit information is output to the user edit information DB 30.

The user database (DB) 26 is a storage device such as a hard disk, and is a device which stores user information. The user information is, for example, information such as the name, the gender, and the user ID of the user. For example, at the time or before using the design creating apparatus 10, the user information is input to the design creating apparatus 10 and stored in the user DB 26.

The user information acquisition unit 28 acquires the user information that is associated with the input user ID from the user DB 26 and outputs the acquired user information to the user edit information DB 30.

The user edit information database (DB) 30 is a storage device such as a hard disk, and is a device which stores edit information indicating the history of editing for a template for individual user. The edit information is associated with the edit information ID which is identification information for identifying the edit information, the user information (for example, the user ID) of the user who performs editing, and the object attribute information indicating the attribute (type) of the object to be edited.

The display data generation unit 32 customizes (processes) the basic template to meet the editing tendency for the template for individual user, thereby generating the individual template, and generating the template display data for displaying the individual template. The template display data is, for example, data of the thumbnail image (reduced image) of the template. In addition, the display data generation unit 32 corresponds to an example of "output unit".

Specifically, in a case where the edit information for the target user is stored in the user edit information DB 30, the display data generation unit 32 acquires the edit information associated with the user ID of the target data from the user edit information DB 30, and then acquires the data of the plural basic templates from the basic template DB 16. In a case where the plural pieces of edit information are associated with the user ID, the display data generation unit 32 acquires the plural pieces of edit information from the user edit information DB 30. The display data generation unit 32 specifies the editing tendency of the user for the template, based on one or plural pieces of edit information, and processes each basic template based on the edit information in which the editing tendency is reflected. Hereinafter, the edit information that reflects the editing tendency is referred to as "meet edit information". In more detail, the display data generation unit 32 specifies the editing tendency of the user for individual type of the object, based on one or plural pieces of edit information, and processes each object to meet the editing tendency for individual object, for individual type of the object, in each basic template. Specifically, the display data generation unit 32 processes each object based on the edit information in which the editing tendency is reflected for individual type of the object (meet edit information). Thus, the plural individual templates are generated. The display data generation unit 32 generates the template display data (thumbnail image data) for displaying the individual template. Further, the display data generation unit 32 generates the template display data, and associates the template display data with the meet edit information indicating the edit contents applied to the basic template, the template ID of the basic template, and information indicating the display name.

In a case where the edit information for the target user is not stored in the user edit information DB 30, the display data generation unit 32 acquires the data of plural basic templates from the basic template DB 16, and generates plural pieces of template display data for displaying the plural basic templates. In this case, the template display data is the thumbnail image data of the basic template. The display data generation unit 32 associates the template display data with the template ID of the basic template, and information indicating the display name.

The display controller 34 generates display information including the plural template display data. For example, the display controller 34 acquires the edit information for the target user from the user edit information DB 30, specifies the editing tendency of the user for the template based on the edit information, and determines the display priority of the template display data based on the editing tendency. The display controller 34 generates display information indicating information indicating the priority. The display information is transmitted to the terminal device 12 by the communication unit 14 through the communication path N, and is displayed. Thus, plural thumbnail images based on the plural template display data are displayed on the terminal device 12 according to the priority. For example, the list of the thumbnail images of the individual template and the basic template is displayed on the terminal device 12 according to the priority. If the user selects the thumbnail image indicating the editing target template from the list, the template display data corresponding to the thumbnail image is transmitted from the terminal device 12 to the design creating apparatus 10 through the communication path N.

In addition, while the template display data (thumbnail image data) is not transmitted from the design creating apparatus 10 to the terminal device 12, the data itself of the template may be transmitted from the design creating apparatus 10 to the terminal device 12. In this case, the list of templates is displayed on the terminal device 12. The template display data (thumbnail image data) or the data of the template corresponds to an example of "information about template".

The editing data generation unit 36 generates the template used in editing. For example, in a case where specific template display data (thumbnail image data) is designated by the user, the designated template display data is input to the editing data generation unit 36. The editing data generation unit 36 refers to the template ID (the template ID of the basic template) associated with the designated template display data, and acquires the data of the basic template associated with the designated template ID from the basic template DB 16. In a case where the meet edit information is not associated with the designated template display data, the editing data generation unit 36 outputs the data of the basic template as the editing data. In a case where the meet edit information is associated with the designated template display data, the editing data generation unit 36 reflects the edited contents indicated by the meet edit information to the basic template. In other words, the editing data generation unit 36 processes respective objects constituting the basic template, according to the meet edit information. Thus, the individual template is generated. The editing data generation unit 36 outputs the data of the individual template as the editing data.

The importing unit 38 outputs the editing data that is generated by the editing data generation unit 36 to the communication unit 14. Thus, the editing data is transmitted to the terminal device 12 through the communication path N. The basic template or the individual template is displayed as the editing data in the terminal device 12, and the basic template or the individual template is edited by the user. The importing unit 38 stores the data of the basic template or the individual template as the editing data in the user template DB 18. Thus, the basic template or the individual template before editing, which are designated by the user, is stored in the user template DB 18.

Figure 3:
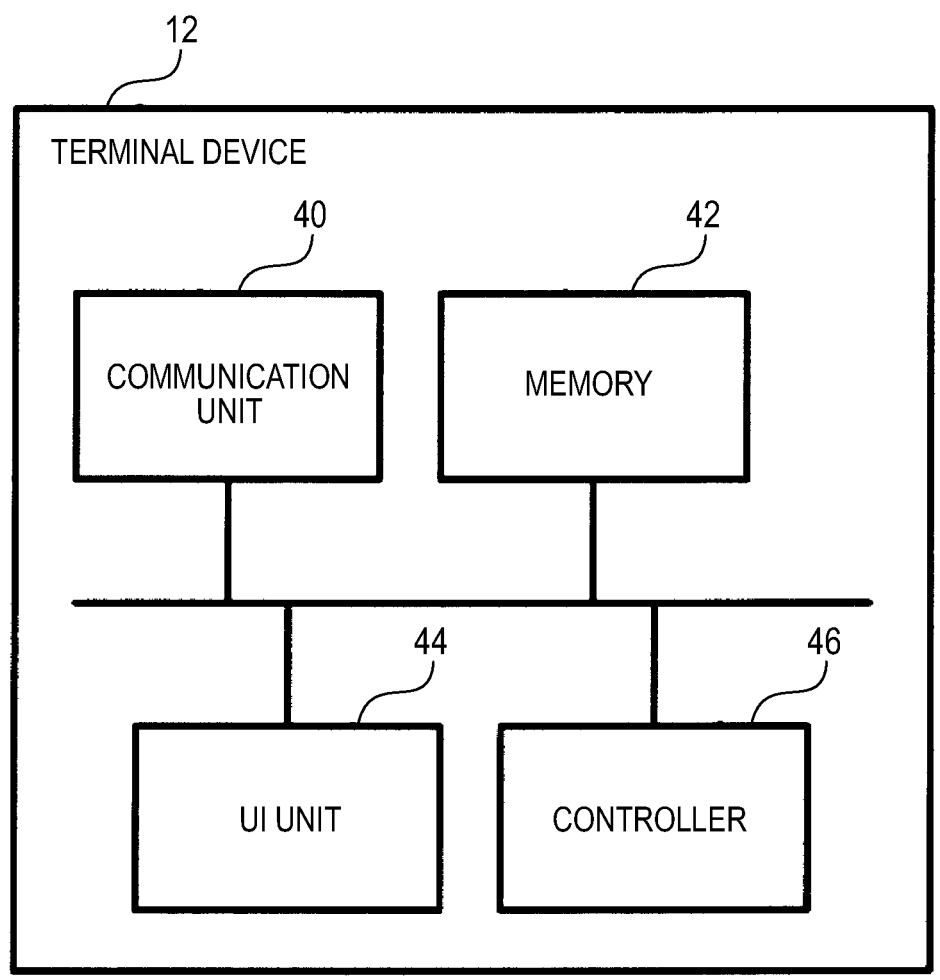
FIG. 3 is a block diagram illustrating a terminal device.

Hereinafter, the terminal device 12 will be described in detail with reference to FIG. 3. FIG. 3 illustrates the configuration of the terminal device 12. A communication unit 40 is a communication interface, and has a function of transmitting data to another apparatus and a function of receiving data from another device through the communication path N. For example, information such as a user ID or template display data is transmitted to the design creating apparatus 10, and information such as template display data or editing data transmitted from the design creating apparatus 10 is received, by the communication unit 40. A memory 42 is a storage device such as a hard disk, and stores programs and data. A UI unit 44 is a user interface, and includes a display and an operation unit. The operation unit is, for example, an input device such as a keyboard, a mouse, or a touch panel. The controller 46 controls the operation of each unit of the terminal device 12.

Hereinafter, the design creating apparatus 10 will be described in detail, with specific examples.

Figure 4:
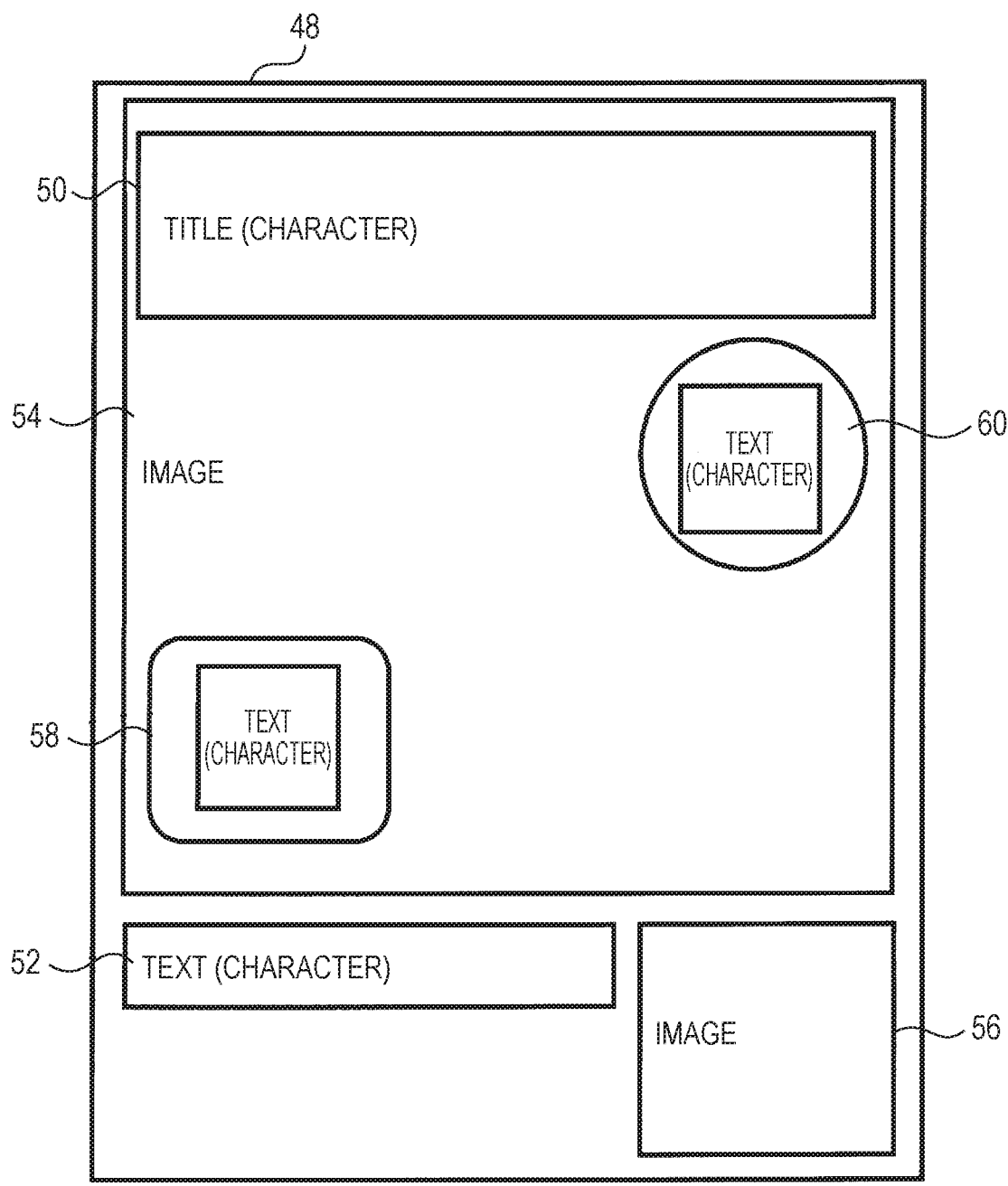
FIG. 4 is a schematic diagram illustrating a configuration of a template.

First, templates will be described in detail with reference to FIG. 4. FIG. 4 illustrates an example of a template that defines a flyer or an advertising design. A template 48 includes, for example, a title object 50, a text object 52, a background image object 54, an image object 56 other than the background image, and graphic objects 58 and 60. The background image object 54 and the image object 56 are, for example, bitmap format images, and the graphic objects 58 and 60 are, for example, vector format graphics. The object attribute (type) of the title object 50 is "title".

The object attribute of the text object 52 is "text". The object attribute of the background image object 54 is "background image". The object attribute of the image object 56 is "image other than background". The object attributes of the graphic objects 58 and 60 are "graphic". These objects are objects for which editing by the user is permitted. Of course, the above objects are only examples, objects of other attributes (types) may be included in the template, and some of the above object group may not be included in the template. For example, the template 48 is a basic template, and an individual template and an edited template are generated based on the template 48.

Plural basic templates are generated in which respective attributes (types) of the object have different designs from each other. Thus, the plural basic templates are created which define the different designs from each other. For example, plural basic templates are created, while making the designs (for example, fonts) for the title object 50 different. Thus, plural basic templates are generated in which the designs (fonts) of the title object 50 are different from each other. The same is applied to other objects. In addition, plural different basic templates are generated for respective target objects. Each basic template is generated in advance, and is stored in the basic template DB 16.

Hereinafter, the process of the design creating apparatus 10 will be described in detail. Specifically, a saving process after template editing, a template display process, and a process during editing will be described.

Saving Process After Template Editing

Figure 5:
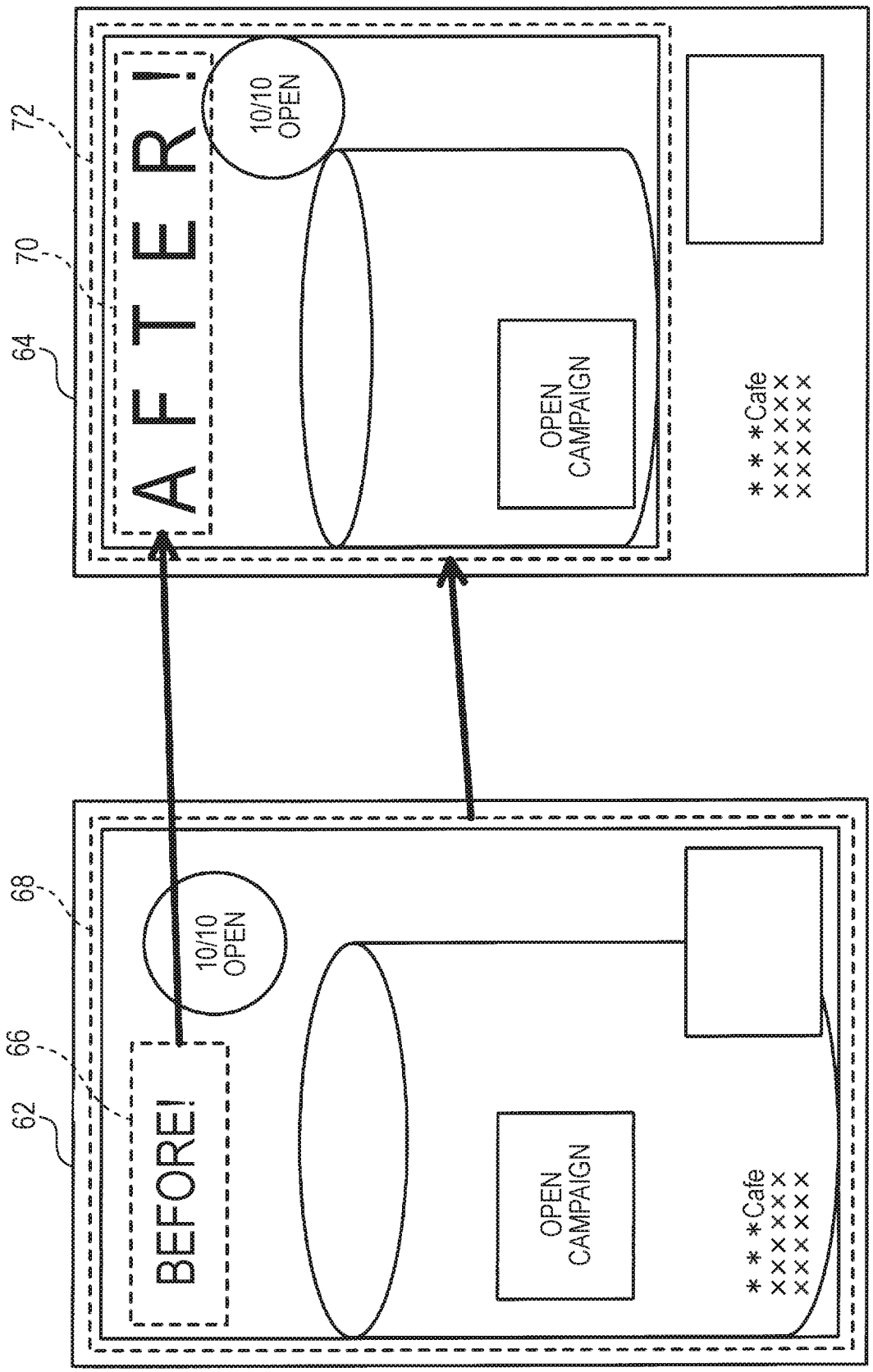
FIG. 5 is a schematic diagram illustrating templates before and after editing.

First, the saving process after template editing will be described in detail with reference to FIG. 5 and FIG. 6. FIG. 5 illustrates a basic template 62 before editing and an edited template 64.

For example, the user accesses the design creating apparatus 10 by using the terminal device 12, and enters a user ID to log in to the design creating apparatus 10. The user ID is transmitted from the terminal device 12 to the design creating apparatus 10 through the communication path N, and a list of thumbnail images of the template is displayed on the UI unit 44 of the terminal device 12. If the user selects the thumbnail image of the basic template 62 from the list, the template display data about the basic template 62 is transmitted from the terminal device 12 to the design creating apparatus 10 through the communication path N. In the design creating apparatus 10, the editing data generation unit 36 refers to the template ID associated with the template display data, and acquires the data of the basic template 62 associated with the template ID, from the basic template DB 16. Since the basic template 62 that is selected by the user is a template before editing, the meet edit information is not associated with the template display data. Therefore, the editing data generation unit 36 outputs the data of the basic template 62 as editing data. The editing data (data of the basic template 62) is transmitted to the terminal device 12 through the communication path N, the 62 is displayed on the UI unit 44 of the terminal device 12. In this state, editing permitted for respective objects constituting the basic template 62. The user edits the basic template 62 by using the terminal device 12.

The importing unit 38 stores the editing data (the data of the basic template 62) and the user ID of the user who designates the basic template 62 in association with each other in the user template DB 18. Thus, the data of the basic template 62 before editing that is designated by the user is stored in the user template DB 18.

In the example of FIG. 5, it is assumed that a title object 66 having the object attribute (type) of "title" and a background image object 68 having the object attribute (type) of "background image" are edited by the user in the basic template 62. The template after editing is indicated as the edited template 64. In the edited template 64, a title object 70 is a title object after editing, and a background image object 72 is a background image object of editing.

A character string "BEFORE!" is defined by the title object 66 before editing, but the character string is changed to "AFTER!". In addition, the font type, the font size, and the size of the title object are also changed. The contents of the change of the title object are described below.
Object attribute: Title
Font: Changed from Jun Pro34 to Shin Maru Go Emboss
Font color: No change
Font size: Changed from 90 pt to 160 pt
Object position: No change
Object size: Changed from (70%, 8%) to (92%, 15%)

In other words, the font size of the character string that is used in the title object and the size of the title object are enlarged.

The contents of the change of the background image object 68 are described below.
Object attribute: Background image
Selected image: No change
Object position: Changed from (0%, 0%) to (0%, 20%)
Object size: Changed from (100%, 100%) to (100%, 80%)

In other words, the background image used in the background image object is not changed, but the position of the background image object is changed, and the size of the background image object is reduced.

The object position is defined by the lateral coordinate and the vertical coordinate of the template. Specifically, in the template, the coordinates of the lower left vertex are the object position (0%, 0%), the coordinates of the lower right vertex are the object position (100%, 0%), the coordinates of the upper left vertex are the object position (0%, 100%), and the coordinates of the upper right vertex are the object position (100%, 100%).

Further, the object size is defined by the lateral length (the width) and the vertical length (the height) of the object. Specifically, the object size is defined by the value of the width of the object when the width of the template is 100% and the value of the height of the object when the height of the template is 100%.

If the editing of the template is ended by the user and the user gives a saving instruction of the template by using the terminal device 12, the data of the edited template 64 transmitted from the terminal device 12 to the design creating apparatus 10 through the communication path N. The template ID of the basic template 62 before editing is associated with the data of the data of the edited template 64. In the design creating apparatus 10, the template storage unit 20 stores the data of the edited template 64 and the user ID of the user who performs editing, in association with each other in the user template DB 18. Thus, the data of the edited template 64 is stored in the user template DB 18. Further, the template ID of the basic template 62 is input to the template acquisition unit 22, and the data of the edited template 64 is input to the edit information acquisition unit 24.

The template acquisition unit 22 receives the template ID of the basic template 62, acquires the data of the unedited template (the basic template 62 before editing in the above example) associated with the template ID from the user template DB 18, and outputs the acquired data to the edit information acquisition unit 24.

The edit information acquisition unit 24 receives the data of the edited template 64 and the data of the basic template 62 before editing, generates edit information indicating a difference between the edited template 64 and the basic template 62 before editing, and outputs the edit information to the user edit information DB 30. The user information acquisition unit 28 receives the user ID transmitted from the terminal device 12, acquires the user information associated with the user ID from the user DB 26, and outputs the acquired user information to the user edit information DB 30. Thus, the edit information and the user information are associated and stored in the user edit information DB 30.

Every time the template is edited, the edit information is generated, and the edit information for individual user is stored in the user edit information DB 30.

FIG. 6 illustrates an edit information table as an example of edit information. In the edit information table, an edit information ID, a user ID, an object attribute (type), and an editing difference are associated with each other. The edit information ID is identification information for identifying each piece of the edit information. The edit information ID is assigned to each object. The user ID is identification information for identifying a user who edits a template. The object attribute is an attribute (type) of the object that is edited in the template. The editing difference is a difference between an edited template and a template before editing, for individual object.

In the example illustrated in FIG. 6, the editing differences respectively associated with edit information IDs "0001" and "0002" are differences between the edited template 64 and the basic template 62 before editing, which are illustrated in FIG. 5. The editing difference associated with the edit information ID "0001" is an editing difference for the object attribute "title", and the editing difference associated with the edit information ID "0002" is an editing difference for the object attribute "background image". Thus, the editing difference (edit information) is managed for individual object.

In addition, there is a case in which an object to which an object attribute is not assigned is included in the template. In a case where the object is edited, the edit information is not created for the object.

Further, although the editing difference alone (edit information) of each object is managed in the example illustrated in FIG. 6, for example, edit information in which plural objects which are related to each other are associated, such as "there is a tendency to place the background so as not to overlap an object of a small character" may be managed.

Template Display Process

Next, a template display process will be described. The display data generation unit 32 receives the user ID of a user who is logging in, and acquires all pieces of edit information that are associated with the user ID from the user edit information DB 30. Next, the display data generation unit 32 extracts edit information for individual object attribute (type) from the all pieces of edit information. Thus, for example, the edit information for the object attribute "title" and the edit information for the object attribute "background image" are respectively extracted. Next, the display data generation unit 32 extracts an edit information group indicating an editing difference in which the states before editing are the same to each other, for individual object attribute. Thus, an edit information group indicating an editing difference in which the states before editing are the same to each other is extracted with respect to the object attribute "title", and an edit information group indicating an editing difference in which the states before editing are the same to each other is extracted with respect to the object attribute "background image".

In addition, the display data generation unit 32 may extract an edit information group indicating an editing difference in which a difference between the states before editing is a threshold or less, as an edit information group indicating an editing difference in which the states before editing are the same to each other. The threshold may be a preset value, or may be changed by the user. For example, an edit information group having a difference between values before editing being the threshold or less, with respect to the font size, the object size, the object color or the like. As an example, with respect to the font size, an edit information group in which a difference between the sizes before editing is included within a range of ±5 pt may be extracted as an edit information group in which the states before editing are the same to each other.

FIG. 7 illustrates a table of an edit information group indicating an editing difference in which the states before editing are the same to each other with respect to the object attribute "title". The edit information illustrated in FIG. 7 is edit information for the user having the user ID of "User0100". For example, the font of the title before editing is "Jun Pro34", the font size is "90 pt", the object size is (70%, 8%), and the states before editing of respective pieces of edit information are the same to each other.

Next, the display data generation unit 32 compares the edit information group (editing difference group) in which the states before editing are the same to each other, for individual object attribute, and extracts an edit information group (editing difference group) in which the states after editing are the same to each other. Next, the display data generation unit 32 counts the number of edit information pieces in which the states after editing are the same to each other, for each individual edit information group, and specifies the edit information having the greatest number as the meet edit information. In other words, the display data generation unit 32 counts the number in which the editing of the same contents is performed, and specifies the edit information (editing difference) having the greatest number, as the meet edit information. The editing difference indicated by the meet edit information is information indicating the editing tendency of the user for the object attribute. In other words, the editing difference indicates the editing preference of the user. The display data generation unit 32 specifies meet edit information for individual object attribute. The display data generation unit 32 acquires a basic template group from the basic template DB 16, and processes respective objects constituting the basic template group, based on the meet edit information for individual object attribute. Thus, an individual template group is generated. In this case, the display data generation unit 32 processes the object having the same state as the state before editing indicated by the meet edit information, and does not process the object which does not have the same state as the state before editing indicated by the meet edit information, in the basic template group based on the meet edit information.

It should be noted that, in a case where plural pieces of different edit information (editing difference) having the greatest counted number, for the same object attribute are acquired, the display data generation unit 32 specifies any a single piece of edit information from among the plural pieces of edit information as meet edit information, and processes each object based on the meet edit information.

In addition, for the same object attribute, in a case where there is edit information in which the editing tendencies in directions which are reverse with each other are reflected, the display data generation unit 32 may offset the counted numbers for these pieces of edit information.

In addition, the display data generation unit 32 may extract an edit information group indicating an editing difference in which a difference between the states after editing is a threshold or less, as an edit information group indicating an editing difference in which the states after editing are the same to each other. The threshold may be a preset value, or may be changed by the user. For example, an edit information group having a difference between values after editing being the threshold or less, with respect to the font size, the object size, the object color or the like. As an example, with respect to the font size, an edit information group in which a difference between the sizes after editing is included within a range of ±5 pt may be extracted as an edit information group in which the states after editing are the same to each other.

It should be noted that in a case where the proportion of the greatest number relative to the number of the edit information in which the states before editing are the same, the display data generation unit 32 may process the basic template based on the meet edit information, and in a case where the proportion is less than the threshold, the display data generation unit 32 may not process the basic template. The threshold may be a preset value, or may be changed by the user.

As an example, it is assumed that the following meet edit information is extracted for the object attribute "title".

Font: Changed from Jun Pro34 to Shin Maru Go Emboss
Font color: No change
Font size: Changed from 90 pt to 160 pt
Object position: No change
Object size: Changed from (70%, 8%) to (92%, 15%)

In other words, the number of times of changes from "Jun Pro34" to "Shin Maru Go Emboss" for the font type becomes the largest, the number of times of changes from "90 pt" to "160 pt" for the font size becomes the largest, and the number of times of changes for the object size from (70%, 8%) to (92%, 15%) becomes the largest. The above contents indicate the editing tendency of the user for the object attribute "title".

The display data generation unit 32 processes the title object based on the meet edit information, in the basic template group. Specifically, the display data generation unit 32 changes the font type of the title object from "Jun Pro34" to "Shin Maru Go Emboss", changes the font size from "90 pt" to "160 pt", and changes the object size from (70%, 8%) to (92%, 15%), in the basic template group.

The display data generation unit 32 does not change the font type, with respect to the title object having a font of a type other than "Jun Pro34". Similarly, the display data generation unit 32 does not change the font size with respect to the title object having a font size other than "90 pt", and does not change the object size with respect to the title object having an object size other than (70%, 8%).

The display data generation unit 32 processes the object based on the meet edit information, with respect to other object attributes in the same manner. Thus, the individual template group for the user having the user ID "User0100" is generated.

The basic template in which objects are not processed based on the meet edit information maintains the state.

Figure 8:
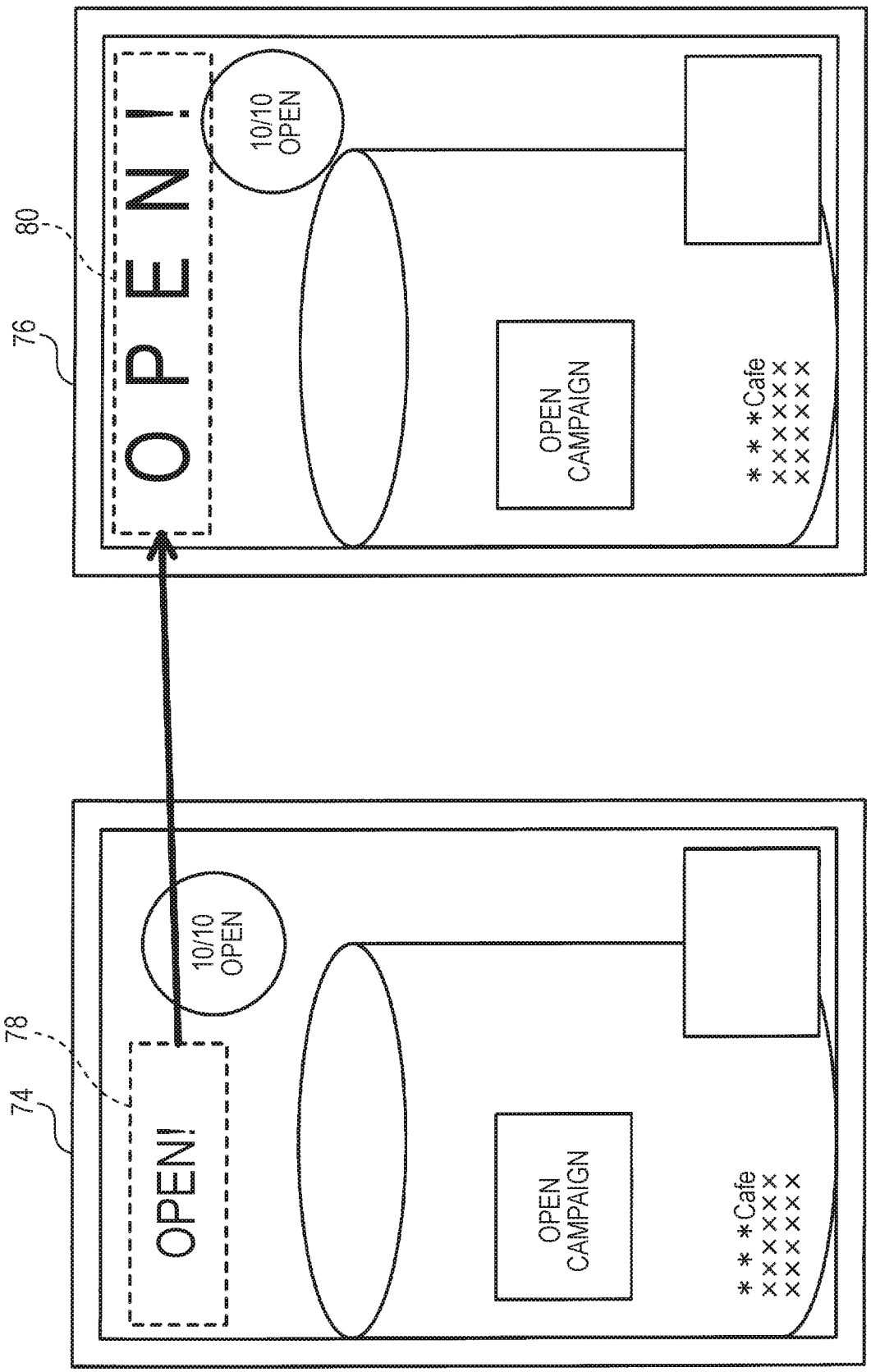
FIG. 8 is a schematic diagram illustrating a basic template and an individual template.

FIG. 8 illustrates the basic template 74 and individual template 76. The basic template 74 is a template before each object is processed based on the meet edit information. For example, the font type, the font size, and the object size of the title object 78 included in the basic template 74 are changed according to the meet edit information about the object attribute "title". Thus, the individual template 76 is generated. The title object 80 included in the individual template 76 is a title object after this change is made. In the example illustrated in FIG. 8, only the title object is changed, but in a case where meet edit information is extracted for other object attributes, other objects are also processed according to the meet edit information.

The display data generation unit 32 generates template display data for displaying the individual template (the thumbnail image data of the individual template). The display data generation unit 32 associates the template display data for the individual template with the meet edit information for individual object attribute, the template ID of the basic template, and information indicating the display name. In the example illustrated in FIG. 8, the display data generation unit 32 generates the template display data for displaying the individual template 76, and associates the template display data with the meet edit information for individual object attribute (for example, the meet edit information about the object attribute "title"), the template ID of the basic template 74, and information indicating the display name. In addition, the display data generation unit 32 generates the template display data (the thumbnail image data of the basic template) for displaying the basic template in which the object is not processed base on the meet edit information, and associates the template display data with the template ID of the basic template, and information indicating the display name. In this manner, an individual template display data group for a user having the user ID "User0100" is generated. The individual template display data group includes a template display data group for displaying the individual template to which the meet edit information is applied, and a template display data group for displaying the basic template to which the meet edit information is not applied. Of course, in the case where the meet edit information is applied to all basic templates, only a template display data group for indicating individual templates is included in the individual template display data group, and in the case where the meet edit information is not applied to all basic templates, only a template display data group for indicating basic templates is included in the individual template display data group.

In addition, the display data generation unit 32 may acquire some pieces of edit information from among all pieces of edit information which are associated with the user ID. For example, the display data generation unit 32 may acquire edit information which is generated within a period which is previously set from the time of login. The editing tendency of the user within the period is specified by using the edit information which is acquired in this manner. For example, the individual template group that meets the most recent editing tendency is generated, without considering older editing tendency than the period, and the template display data group for displaying the individual template group is generated.

If the individual template display data group is generated, the display controller 34 generates display information including the individual template display data group. First, the display controller 34 acquires all pieces of edit information associated with the user ID from the user edit information DB 30. Next, the display controller 34 extracts edit information for individual object attribute, and extracts a group of edit information pieces of which states after editing are the same to each other for individual object attribute, from the all pieces of edit information. The display controller 34 counts the number of edit information in which states after editing are the same to each other, for individual edit information group, and specifies edit information for which a proportion of the counted number relative to the number of all pieces of edit information for the object attribute is equal to or greater than a threshold, as a priority key in the list display. The threshold may be a preset value, or may be changed by the user. In a case where there are plural pieces of edit information having the proportion of the counted number being equal to or greater than the threshold for the same object attribute, the display priority is determined in a descending order of the counted number. The priority of the edit information having a high counted number becomes higher.

In addition, the display controller 34 may extract an edit information group indicating an editing difference in which a difference between the states after editing is a threshold or less, as edit information indicating an editing difference in which the states after editing are the same to each other. The threshold may be a preset value, or may be changed by the user. For example, an edit information group having a difference between values after editing being the threshold or less, with respect to the font size, the object size, the object color or the like. As an example, with respect to the font size, an edit information group in which a difference between the sizes after editing is included within a range of ±5 pt may be extracted as an edit information group in which the states after editing are the same to each other.

The display controller 34 outputs display information including a priority key. The display information is transmitted to the terminal device 12 through communication path N by the communication unit 14. Thus, the thumbnail image group based on the individual template display data group is displayed on the UI unit 44 of the terminal device 12. In other words, the thumbnail image group of the individual template and the thumbnail image group of the basic template are displayed. In this case, the thumbnail image of a template having the same state as the state after editing indicated by the edit information which is the priority key is preferentially displayed.

For example, in a case where the edit information in which the state after editing is "object attribute: title, the font size: 160 pt, and the object size: (92%, 15%)" is specified as a top priority key, the thumbnail image group of the individual template or the basic template having the title object in which the font size is 160 pt and the object size is (92%, 15%) is displayed as a top priority thumbnail image.

FIG. 9 illustrates a display example of thumbnail images of templates. A template collection screen 82 is displayed on the UI unit 44 of the terminal device 12. A group of thumbnail images of templates is displayed as a list on the template collection screen 82. For example, thumbnail images 84 to 92 which are surrounded by broken lines are thumbnail images of templates having a top priority, and are preferentially displayed than another thumbnail image group 94. As an example, the thumbnail images 84 to 92 are display on higher positions than the other thumbnail image group 94. In addition, a search key (for example, a character string or a taste) which is designated by the user may be used as the top priority key, and a key based on the edit information may be used secondarily.

Even in a case where the user does not give a saving instruction of the template, the edit information acquisition unit 24 may acquire the edit information at all times. In other words, the edit information acquisition unit 24 may acquire the edit information each time the editing is performed by the user. For example, in a case where plural number of editing is continuously performed for the same object, the edit information acquisition unit 24 acquires not only the edit information indicating final editing, but also the edit information of each individual editing. In this case, the edit information indicating editing, which is attempted but is not finally adopted by the user, is also stored in the user edit information DB 30. The display controller 34 may lower the priority of the thumbnail image of the template having the same state as the state after editing indicated by the edit information that is not finally adopted.

Process During Editing

Next, a process during editing will be described. First, the user specifies a target template by using the terminal device 12. For example, a template collection screen 82 that is illustrated in FIG. 9 is displayed in the terminal device 12, and the user selects a target thumbnail image from the thumbnail image group of templates, which is displayed on the template collection screen 82. For example, the thumbnail image of the individual template 76, which is illustrated in FIG. 8, is assumed to be selected. In this case, the template display data of the individual template 76 is transmitted from the terminal device 12 to the design creating apparatus 10 through the communication path N. In the design creating apparatus 10, the editing data generation unit 36 refers to the template ID associated with the template display data, and acquires the data of the basic template 74 associated with the template ID, from the basic template DB 16. Meet edit information indicating an editing difference between the basic template 74 and the individual template 76 is associated with the template display data of the individual template 76. Therefore, the editing data generation unit 36 processes each object that is included in the basic template 74, according to the meet edit information. Accordingly, the individual template 76 is generated, and the data of the individual template 76 is output as the editing data. The editing data (data of the individual template 76) is transmitted to the terminal device 12 through the communication path N, and the individual template 76 is display on the UI unit 44 of the terminal device 12. In this state, it is allowed to edit respective objects constituting the individual template 76. The user edits the individual template 76 by using the terminal device 12.

Meanwhile, the importing unit 38 stores the editing data (data of the individual template 76) and the user ID of the user who designates the individual template 76 in the user template DB 18 in association with each other. Thus, the data of the individual template 76 before editing is stored in the user template DB 18. In a case where the individual template 76 is edited by the user, the saving process after template editing is performed. Thus, the data of the edited template is stored in the user template DB 18, and the edit information indicating the editing difference between the individual template 76 and the edited template is stored in the user edit information DB 30. The edit information is used during a generation process of the template display data, and the individual template in which the editing difference is reflected is generated.

According to the present exemplary embodiment as described above, an editing tendency is specified for individual user, based on the history of editing performed by the user for the template, the editing tendency of each user, in other words, an individual template that meets the editing preference is generated. Thus, a template collection specific to the user is provided for individual user. Therefore, it is likely to find out the target template (for example, a template that meets the editing preference of the user) for individual user, as compared with the case of providing a common uniform template to any user.

For example, in a case where a certain user has a tendency to use a larger font size for the title object, an individual template with a title object having a larger font size is generated, and is preferentially provided. Further, in the case where such a template is registered as a basic template, the basic template is provided preferentially. Thus, the searching property for a template is improved for the user with such an editing tendency, as compared to the case where a uniform template collection is provided.

Further, the edit information is also used as feedback information, thereby improving the specific accuracy of the editing tendency (editing preference) of the user.

Modification Example

Next, a modification example will be described. In the modification example, the display data generation unit 32 processes respective objects to meet the editing tendency for the respective objects, according to the combination of plural objects constituting the template. The modification example will be described below with reference to specific examples.

In the modification example, the edit information acquisition unit 24 generates edit information indicating an editing difference between the edited template and the unedited template for individual object, extracts information about other objects other than the object (hereinafter, referred to as "other object information") from the edited template and includes other object information in the edit information for individual object. Thus, edit information including the information indicating the editing difference for the object and other object information is stored in the user edit information DB 30.

The display data generation unit 32 extracts an edit information group indicating a difference in which the states before editing are the same to each other, as in the exemplary embodiment described above.

FIG. 10 illustrates a table of an edit information group indicating an editing difference in which the states before editing are the same to each other, with respect to the object attribute "title". The edit information illustrated in FIG. 10 is edit information for the user of the user ID "User0100". In the example illustrated in FIG. 10, all the font sizes before editing are "90 Pt" in respective pieces of edit information. In the modification example, "other object information" is added in the table. In the example illustrated in FIG. 10, the processing target object attribute is "title", and the objects of other attributes are a background image object or the like. For example, as the information about the background image object, the object size, an image motif, and the like are extracted from the edited template, and are stored in the table. The image motif is a subject that the background image object has, and is, for example, information that is extracted by pre-analysis of the background image object. For example, the image motif of the background image object that is associated with the edit information IDs "0011" and "0543" is "meat", and the image motif of the background image object that is associated with the edit information ID "0107" is "fried chicken". For example, the information indicating the image motif is associated with the background image object, and the edit information acquisition unit 24 extracts other object information including the information indicating the image motif, from the edited template.

The display data generation unit 32 processes, for every basis template, the processing target object to meet the editing tendency for the processing target object, depending on a combination of the processing target object (for example, the title object) and another object (for example, the background image object).

Specifically, the display data generation unit 32 specifies the editing tendency of a processing target object, based on the edit information about the processing target object when the processing target object (for example, the title object) and another object (for example, the background image object) are combined. A specific example thereof will be described. The display data generation unit 32 extracts an edit information group in which states after editing are the same to each other and with which the same other object information is associated, for individual object attribute, counts the number of edit information pieces in which states after editing are the same to each other for individual edit information group, and specifies edit information having the greatest counted number as meet edit information.

For example, it is assumed that the number of times to change the font size from 90 pt to 160 pt is the greatest, and among the number of times, the number of times to change is greatest in a case where the image motif of the background image object which is another object is "meat". In this case, if the image motif of the background image object about "another object" is "meat", the editing tendency for the object attribute "title" is "the font size being changed from 90 pt to 160 pt", and the meet edit information is information indicating the contents.

The display data generation unit 32 processes the processing target object to meet the editing tendency for the processing target object, with a basic template including a combination of the processing target object (title object) and another object (the background image object having the image motif of "meat") as a target, among plural basic templates. Thus, the individual template is generated.

Specifically, the display data generation unit 32 changes the font size of the title object into "160 pt", in the basic template having the background image object having the image motif of "meat", and having the title object of the font size "90 pt". Meanwhile, even if the font size of the title object is "90 pt", the display data generation unit 32 does not change the font size into "160 pt", with respect to the basic template having the background image object having the image motif other than "meat".

FIG. 11 illustrates an example of templates before and after processing. The basic template 96 is a template having a background image object having the image motif of "meat", and having the title object 98 of the font size "90 pt".

Therefore, the font size of the title object 98 is changed from "90 pt" to "160 pt", and thus the individual template 100 is generated. The individual template 100 has the title object 102 of the font size "160 pt".

Meanwhile, the basic template 104 is a template having a background image object having the image motif of "fish", and having the title object 106 of the font size "90 pt". Since the image motif is not "meat", the font size maintains "90 pt".

In this way, in Modification example 1, the editing tendency of the processing target object is specified by a combination of plural objects. Thus, a template is provided in which the specification accuracy of the editing tendency is increased and which further meets the editing tendency of the user, as compared to the case of specifying the editing tendency of the user from the edit information of a single object.

The design creating apparatus 10 is implemented by cooperation of hardware resources and software as an example. Specifically, the design creating apparatus 10 includes a processor such as a CPU which is not illustrated. The processor reads and executes the program stored in the storage device, which is not illustrated, and implements the functions of the respective parts of the design creating apparatus 10. The program is stored in the storage device through a recording medium such as a CD or a DVD, or through a communication path such as a network.

Alternatively, the respective parts of the design creating apparatus 10 may be implemented by, for example, hardware resources such as a processor or an electronic circuit. A device such as a memory may be used for the implementation. As another example, the respective parts of the design creating apparatus 10 may be implemented by a digital signal processor (DSP), a field programmable gate array (FPGA), or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A design creating apparatus comprising:
a memory that stores a plurality of templates which define different designs from each other with respect to a target object, each of the templates including a plurality of objects; and
a processor programmed to execute a process stored in the memory, the process comprising:

acquiring, for an individual user, edit information indicating a history of editing for respective objects for each of the templates;

counting the number of times that editing with same contents is performed, for the individual user and an individual object, based on the edit information, with respect to the plurality of templates;

processing the plurality of templates by performing editing on the individual object, for which the counted number of times is greatest, as an indication of an editing tendency, with the plurality of templates as a target;

receiving a selection of a template from a plurality of templates by the individual user;

editing the template selected by the individual user so that the respective objects of the template satisfy the editing tendency which is a most performed editing to the objects, in the history of editing by the individual user, based on the edit information, the most performed editing being editing for which the counted number of times that editing with the same contents is performed is the greatest; and outputting the edited template for the individual user.

2. The design creating apparatus according to claim 1, wherein types of the a plurality of objects in the template are different from each other, and wherein the process further comprises:
acquiring the edit information indicating the history of editing for respective objects, for the individual user; and processing the respective objects to meet the editing tendency for the respective objects which are obtained from the edit information, for individual type of the respective objects, with the plurality of templates as a target, and outputting information about a plurality of templates which are subjected to the process.

3. The design creating apparatus according to claim 2, wherein the process further comprises:
acquiring another object information indicating another object which is not edited in each of the templates; and
performing the specified editing for each type of the object in the templates having the another object.

4. A non-transitory computer readable medium storing a program causing a computer to perform a process of a design creating apparatus, the process comprising:
acquiring, for an individual user, edit information indicating a history of editing for respective objects for each of a plurality of templates which define different designs from each other for a target object, each of the templates including a plurality of objects;

counting the number of times that editing with same contents is performed, for the individual user and an individual object, based on the edit information, with respect to the plurality of templates;

processing the plurality of templates by performing editing on the individual object, for which the counted number of times is greatest, as an indication of an editing tendency, with the plurality of templates as a target;

receiving a selection of a template from a plurality of templates by the individual user;

editing the template selected by the individual user so that the respective objects of the template satisfy the editing tendency which is a most performed editing to the objects, in the history of editing by the individual user, based on the edit information, the most performed editing being editing for which the counted number of times that editing with the same contents is performed is the greatest; and outputting the edited template for the individual user.

5. A method for causing a computer to perform a process of a design creating apparatus, the process comprising:
acquiring, for an individual user, edit information indicating a history of editing for respective objects for each of a plurality of templates which define different designs from each other for a target object, each of the templates including a plurality of objects;

counting the number of times that editing with same contents is performed, for the individual user and an individual object, based on the edit information, with respect to the plurality of templates;

processing the plurality of templates by performing editing on the individual object, for which the counted number of times is greatest, as an indication of an editing tendency, with the plurality of templates as a target;

receiving a selection of a template from a plurality of templates by the individual user;

editing the template selected by the individual user so that the respective objects of the template satisfy the editing tendency which is a most performed editing to the objects, in the history of editing by the individual user, based on the edit information, the most performed editing being editing for which the counted number of times that editing with the same contents is performed is the greatest; and outputting the edited template for the individual user.

* * * * *